United States Patent
Manabe et al.

(10) Patent No.: US 10,986,290 B2
(45) Date of Patent: Apr. 20, 2021

(54) WIDE DYNAMIC RANGE IMAGE SENSOR WITH GLOBAL SHUTTER

(71) Applicant: OmniVision Technologies, Inc., Santa Clara, CA (US)

(72) Inventors: Sohei Manabe, San Jose, CA (US); Keiji Mabuchi, Los Altos, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 155 days.

(21) Appl. No.: 15/983,954

(22) Filed: May 18, 2018

(65) Prior Publication Data

US 2019/0356872 A1 Nov. 21, 2019

(51) Int. Cl.
*H04N 5/353* (2011.01)
*H04N 5/355* (2011.01)
*H04N 5/3745* (2011.01)
*H04N 5/378* (2011.01)

(52) U.S. Cl.
CPC ......... *H04N 5/3535* (2013.01); *H04N 5/3559* (2013.01); *H04N 5/378* (2013.01); *H04N 5/37452* (2013.01)

(58) Field of Classification Search
CPC ............... H04N 5/3535; H04N 5/3559; H04N 5/37452; H04N 5/378
See application file for complete search history.

(56) References Cited

U.S. PATENT DOCUMENTS

| | | | |
|---|---|---|---|
| 8,089,036 B2 | 1/2012 | Manabe | |
| 8,736,726 B2 * | 5/2014 | Panicacci | H04N 5/23248 348/294 |
| 9,936,153 B1 * | 4/2018 | Mao | H04N 5/378 |
| 2008/0018763 A1 * | 1/2008 | Sato | H04N 5/335 348/308 |
| 2009/0201400 A1 | 8/2009 | Zhang et al. | |
| 2013/0135486 A1 * | 5/2013 | Wan | H04N 5/765 348/207.99 |
| 2013/0228691 A1 | 9/2013 | Shah | |
| 2014/0339396 A1 * | 11/2014 | Nam | H04N 5/3535 250/208.1 |
| 2017/0347047 A1 * | 11/2017 | Mao | H01L 27/14612 |
| 2017/0350755 A1 * | 12/2017 | Geurts | G01J 1/4228 |
| 2017/0366764 A1 * | 12/2017 | Innocent | H04N 5/3575 |
| 2018/0054576 A1 * | 2/2018 | Otaka | H04N 5/3559 |
| 2019/0260949 A1 * | 8/2019 | Geurts | H04N 5/35554 |
| 2019/0273879 A1 * | 9/2019 | Xu | H04N 5/3559 |

OTHER PUBLICATIONS

ROC (Taiwan) Patent Application No. 108115976—Office Action with English translation dated Mar. 3, 2020, 20 pages.

* cited by examiner

*Primary Examiner* — Antoinette T Spinks

(74) *Attorney, Agent, or Firm* — Christensen O'Connor Johnson Kindness PLLC

(57) ABSTRACT

An image sensor includes a photodiode disposed in a semiconductor material to generate image charge in response to incident light, and a first transfer gate is coupled to the photodiode to extract image charge from the photodiode in response to a first transfer signal. A first storage gate is coupled to the first transfer gate to receive the image charge from the first transfer gate, and a first output gate is coupled to the first storage gate to receive the image charge from the first storage gate. A first capacitor is coupled to the first output gate to store the image charge.

19 Claims, 6 Drawing Sheets

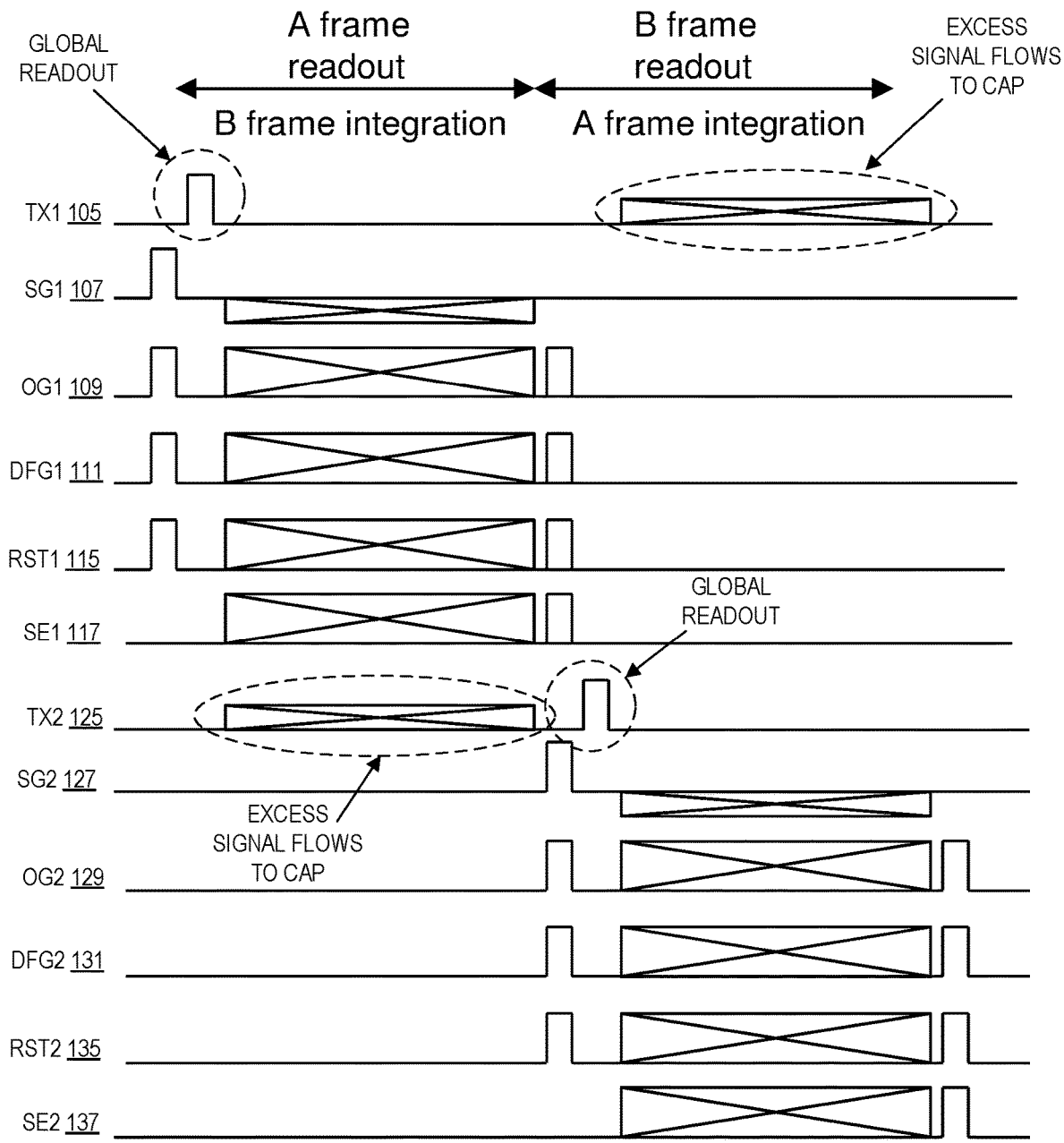

ROLLING READOUT TIMING

ROLLING READOUT ALTERNATE TIMING

WIDE DYNAMIC RANGE IMAGE SENSOR WITH GLOBAL SHUTTER

TECHNICAL FIELD

This disclosure relates generally to image sensors, and in particular but not exclusively, relates to CMOS image sensors.

BACKGROUND INFORMATION

Image sensors have become ubiquitous. They are widely used in digital still cameras, cellular phones, security cameras, as well as, medical, automobile, and other applications. The technology used to manufacture image sensors has continued to advance at a great pace. For example, the demands of higher resolution and lower power consumption have encouraged the further miniaturization and integration of these devices.

The typical image sensor operates as follows. Image light from an external scene is incident on the image sensor. The image sensor includes a plurality of photosensitive elements such that each photosensitive element absorbs a portion of incident image light. Photosensitive elements included in the image sensor, such as photodiodes, each generate image charge upon absorption of the image light. The amount of image charge generated is proportional to the intensity of the image light. The generated image charge may be used to produce an image representing the external scene.

Image sensors may have rolling shutters (i.e., image data is captured by the pixels one row or column at a time) or global shutters (i.e., image data is captured by all the pixels at the same time). There are advantages to each approach, rolling shutters generally involve less circuitry but may result in distortions. Conversely, the image distortions caused by rolling shutters are not caused by global shutters since all pixel charge is captured at the same time.

BRIEF DESCRIPTION OF THE DRAWINGS

Non-limiting and non-exhaustive examples of the invention are described with reference to the following figures, wherein like reference numerals refer to like parts throughout the various views unless otherwise specified.

FIG. 3A-3C depict example timing diagrams which may show the timing of pixels depicted in FIGS. 1A-2, in accordance with the teachings of the present disclosure.

Figure 1A:
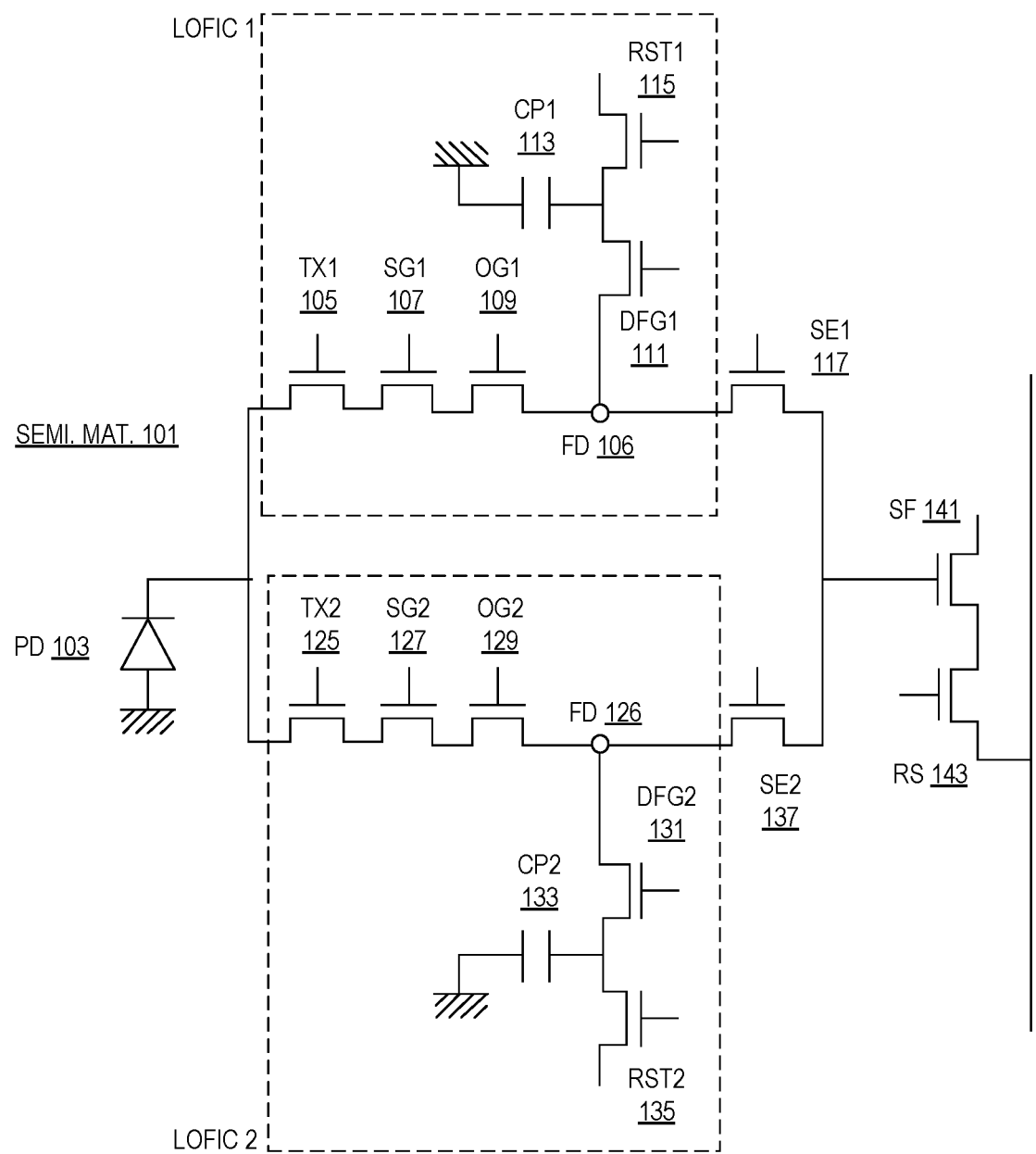
FIGS. 1A-1B depict example pixel circuits, in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method relating to a wide dynamic range image sensor with a global shutter are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Examples in accordance with the teachings of the present disclosure relate to a modified global shutter pixel. As stated, global shutter technologies have advantages such as not producing images that are distorted. However, typically the full-well capacity (FWC) of global shutter devices isn't large, because the storage node may have a limited FWC. Solutions proposed herein solve this problem. In one example a voltage domain global shutter is disclosed. In another example, a pseudo-global shutter is disclosed.

One concept illustrated in the examples shown below, is combination of global shutter and lateral overflow integration circuit (LOFIC) architecture. A photodiode is connected to two LOFICs, and a source follower circuit is shared by the two LOFICs. One transfer transistor has a transfer signal that fires when the storage gate turns off during readout to the latter stage circuit. The other transfer transistor is operated at faster frame rate frequency, to transfer excess signal at the photodiode to an additional capacitor. This frequency is several times faster than the first frame rate frequency. Additionally the floating diffusion is boosted by added capacitance from the capacitor.

Figure 1B:
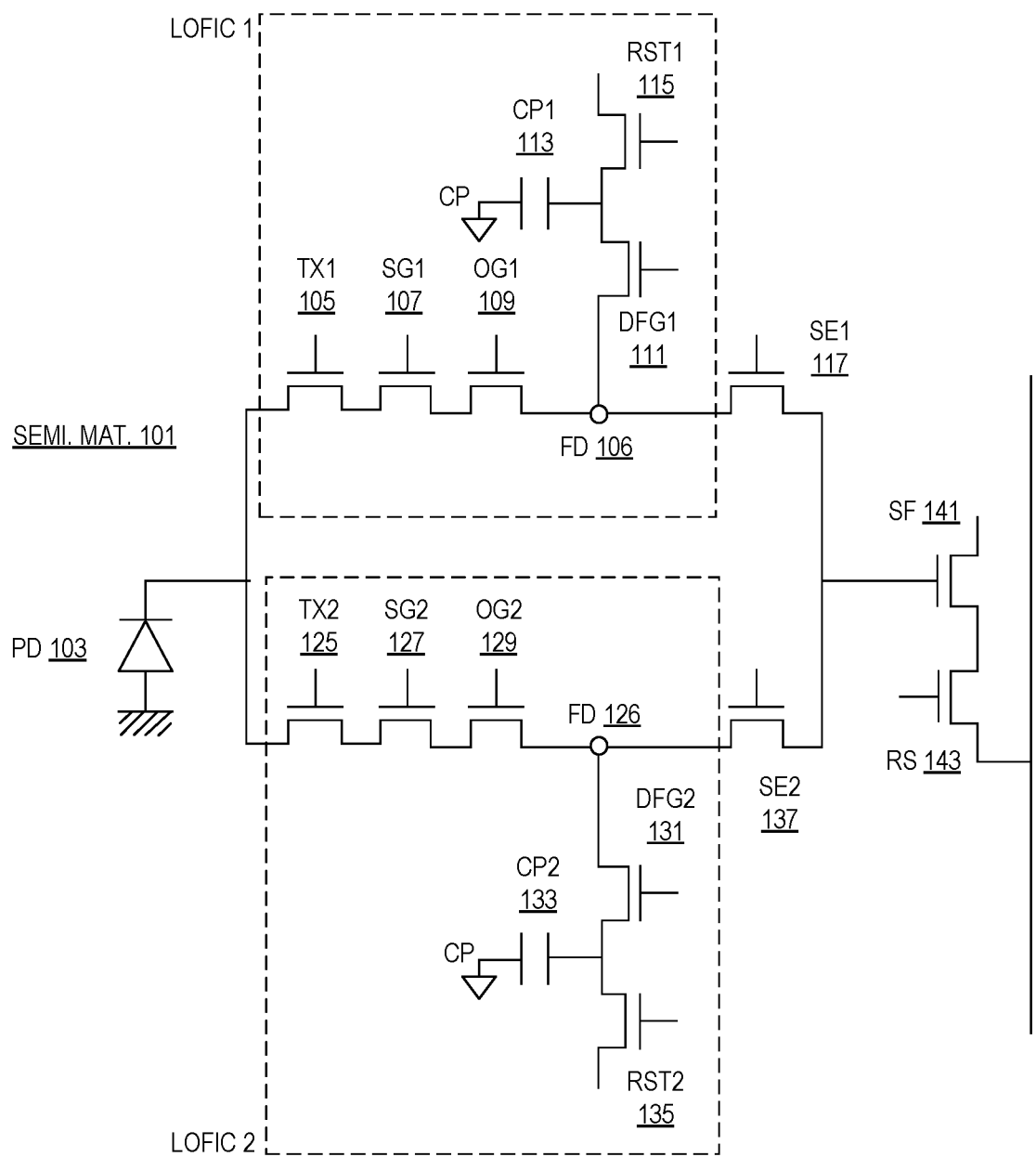

FIGS. 1A-1B depict example pixel circuits, in accordance with the teachings of the present disclosure. As shown, both figures depict two global shutter/LOFICs coupled to a single photodiode. It is appreciated that the circuits depicted in FIGS. 1A and 1B may be repeated many times across the surface of the image sensor to form an array (see e.g., FIG. 2).

FIG. 1A includes semiconductor material 101, photodiode 103, first transfer gate 105, first storage gate 107, first output gate 109, first floating diffusion 106, first dual floating diffusion gate 111, first capacitor 113, first reset gate 115, first select transistor 117, second transfer gate 125, second storage gate 127, second output gate 129, second floating diffusion 126, second dual floating diffusion gate 131, second capacitor 133, second reset gate 135, second select transistor 137, source follower transistor 141, and row select transistor 143.

In the depicted example, photodiode 103 is disposed in semiconductor material 101 to generate image charge in response to incident light. Photodiode 103 may absorb red light, blue light, green light, infrared light or the like depending on the type of filter placed between photodiode 103 and the light source. The first LOFIC (LOFIC 1) includes first transfer gate 105 coupled to photodiode 103 to extract image charge from photodiode 103 in response to a first transfer signal applied to a gate terminal of transfer gate 105 (the transfer signal "turns on" transfer gate 105). First storage gate 107 is coupled to first transfer gate 105 to receive the image charge from the first transfer gate 105. It is appreciated that first storage gate 107 may contain a storage node (e.g., a doped portion of semiconductor material 101 or the like) to store the image charge output from photodiode 103 in order to facilitate global readout. First output gate 109 is coupled to first storage gate 107 to receive image charge from first storage gate 107 and transfer the image charge to first floating diffusion 106 when first output gate 109 is turned on. First capacitor 113 is coupled (through first floating diffusion 106 and first dual floating diffusion gate 111) to first output gate 109 to store the image charge on first capacitor 113. First capacitor 113 may be used to increase the dynamic range of the pixel since it can hold additional charge that otherwise would saturate the pixel.

As shown the second LOFIC (LOFIC 2) includes second transfer gate 125 coupled to photodiode 103 to extract the image charge from photodiode 103 in response to a second transfer signal. Second storage gate 127 is coupled to second transfer gate 125 to receive the image charge from second transfer gate 125. It is appreciated that second storage gate 127 may contain a storage node (e.g., a doped portion of semiconductor material 101 or the like) to store the image charge output from photodiode 103 in order to facilitate global readout. Second output gate 129 is coupled to second storage gate 127 to receive the image charge from second storage gate 127. Second capacitor 133 is coupled (through second floating diffusion 126 and second dual floating diffusion gate 131) to second output gate 129 to store the image charge. Although in the depicted example the second LOFIC has all the same hardware components as the first LOFIC, the pieces of circuitry in each LOFIC operate at different timing and frequencies to enhance image sensor performance (e.g., improve the full well capacity of the image sensor pixel and prevent distortion), in accordance with the teachings of the present disclosure. Thus the circuits each perform their own unique operations and are not merely a repeated unit.

As illustrated first dual floating diffusion gate 111 is coupled between first output gate 109 (and first floating diffusion 106) and first capacitor 113 to output the image charge on first floating diffusion 106 to first capacitor 113. Second dual floating diffusion gate 131 is coupled between second output gate 129 (and second floating diffusion 126) and second capacitor 133 to output the image charge from second floating diffusion 126 to second capacitor 133. It is appreciated that capacitors 113 and 133 may include a well in semiconductor material 101, parallel plates or lines, or the like.

In the depicted example, source follower transistor 141 is coupled to first floating diffusion 106 and second floating diffusion 126 to amplify the image charge on at least one of first floating diffusion 106 or second floating diffusion 126. To amplify charge on first floating diffusion 106, first select transistor 117 is coupled between first floating diffusion 106 and source follower transistor 141 to output the image charge from first floating diffusion 106 (and the first LOFIC) to source follower transistor 141 in response to a first select signal (applied to a gate electrode of first select transistor 117), which connects first select transistor 117 to the gate terminal of source follower transistor 141. Similarly, second select transistor 137 is coupled between second floating diffusion 126 and source follower transistor 141 to output the image charge from second floating diffusion 126 (and the second LOFIC) to source follower transistor 141 in response to a second select signal. As depicted, row select transistor 143 is coupled to a first terminal of source follower transistor 141 to output the amplified image signal from source follower 141.

In the depicted example, first reset transistor 115 is coupled to first capacitor 113 to reset the image charge in first capacitor 113 and floating diffusion 106 (when first dual floating diffusion gate 111 is on), in response to a first reset signal (applied to the gate electrode of first reset transistor 115). Like first reset transistor 115, second reset transistor 135 is coupled to second capacitor 133 to reset the image charge in second capacitor 133 and floating diffusion 126 in response to a second reset signal.

In the depicted examples, transferring the image charge from photodiode 103 to a first lateral overflow integration circuit (LOFIC 1) occurs at a first frame rate, and transferring the image charge from photodiode 103 to a second LOFIC (LOFIC 2) occurs at a second frame rate. In the depicted example, the second frame rate is many times faster than the first frame rate (e.g., 2×, 5×, 10×, or 100× times faster than the first frame rate).

In the example depicted in FIG. 1A first capacitor 113 is coupled to chassis ground. Conversely, in FIG. 1B second capacitor is coupled to signal ground.

Figure 2:
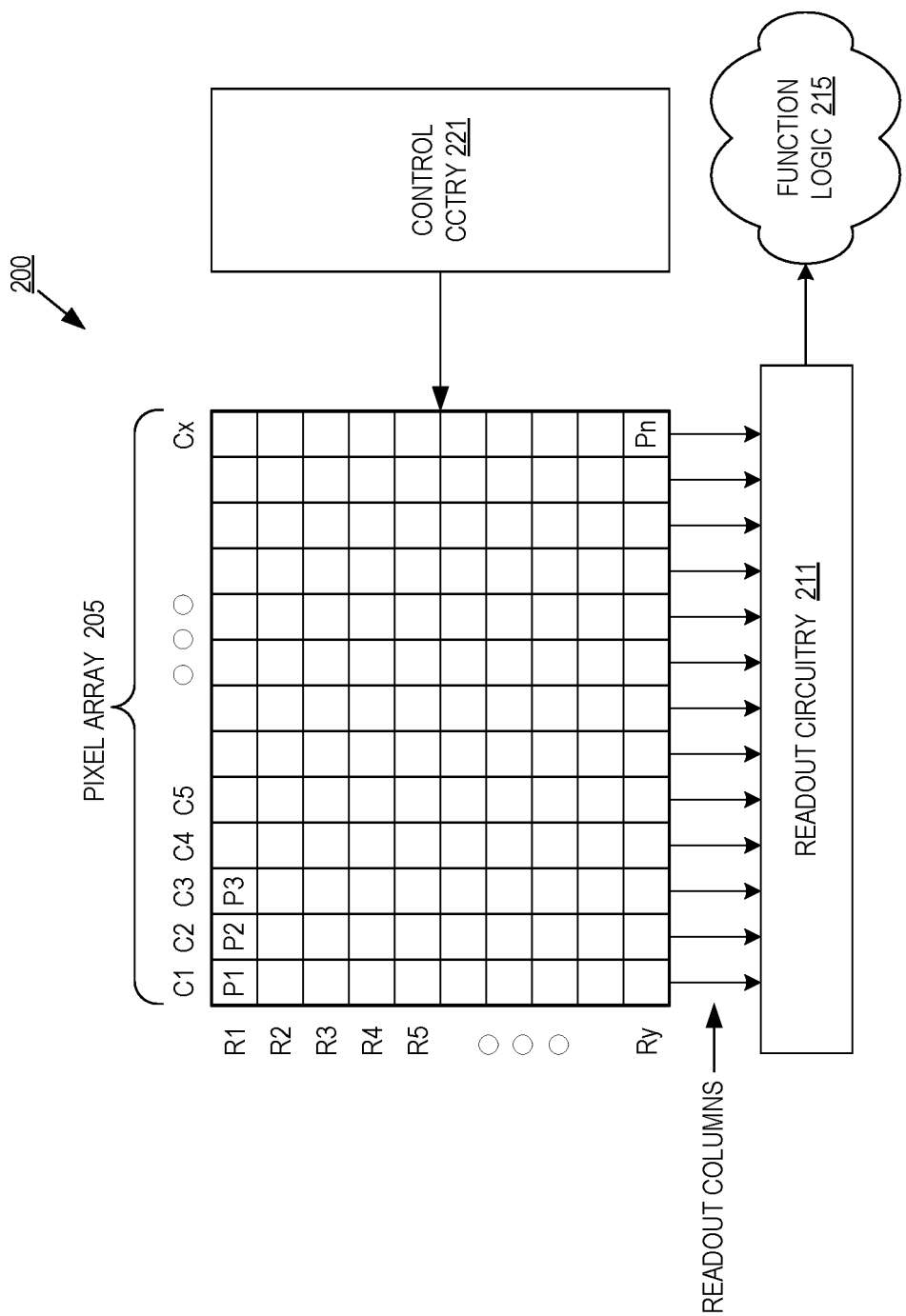
FIG. 2 illustrates a block diagram of one example of an imaging system which may include aspects of FIGS. 1A-1B, in accordance with the teachings of the present disclosure.

FIG. 2 illustrates a block diagram of one example of an imaging system 200 which may include aspects of FIGS. 1A-1B, in accordance with the teachings of the present disclosure. Imaging system 200 includes pixel array 205, control circuitry 221, readout circuitry 211, and function logic 215. In one example, pixel array 205 is a two-dimensional (2D) array of photodiodes, or image sensor pixels (e.g., pixels P1, P2 . . . , Pn). As illustrated, photodiodes are arranged into rows (e.g., rows R1 to Ry) and columns (e.g., column C1 to Cx) to acquire image data of a person, place, object, etc., which can then be used to render a 2D image of the person, place, object, etc. However, photodiodes do not have to be arranged into rows and columns and may take other configurations.

In one example, after each image sensor photodiode/pixel in pixel array 205 has acquired its image data or image charge, the image data is readout by readout circuitry 211 and then transferred to function logic 215. In various examples, readout circuitry 211 may include amplification circuitry, analog-to-digital (ADC) conversion circuitry, or otherwise. Function logic 215 may simply store the image data or even manipulate the image data by applying post image effects (e.g., autofocus, crop, rotate, remove red eye, adjust brightness, adjust contrast, or otherwise). In one example, readout circuitry 211 may readout a row of image data at a time along readout column lines (illustrated) or may readout the image data using a variety of other techniques (not illustrated), such as a serial readout or a full parallel readout of all pixels simultaneously.

In one example, control circuitry 221 is coupled to pixel array 205 to control operation of the plurality of photodiodes in pixel array 205. For example, control circuitry 221 may generate a shutter signal (see e.g., FIG. 3A-3C) for controlling image acquisition. In the depicted example, the shutter signal is a global shutter signal for simultaneously enabling all pixels within pixel array 205 to simultaneously capture their respective image data during a single acquisition window. In another example, image acquisition is synchronized with lighting effects such as a flash.

In one example, imaging system 200 may be included in a digital camera, cell phone, laptop computer, automobile or the like. Additionally, imaging system 200 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 200, extract image data from imaging system 200, or manipulate image data supplied by imaging system 200.

Figure 3B:
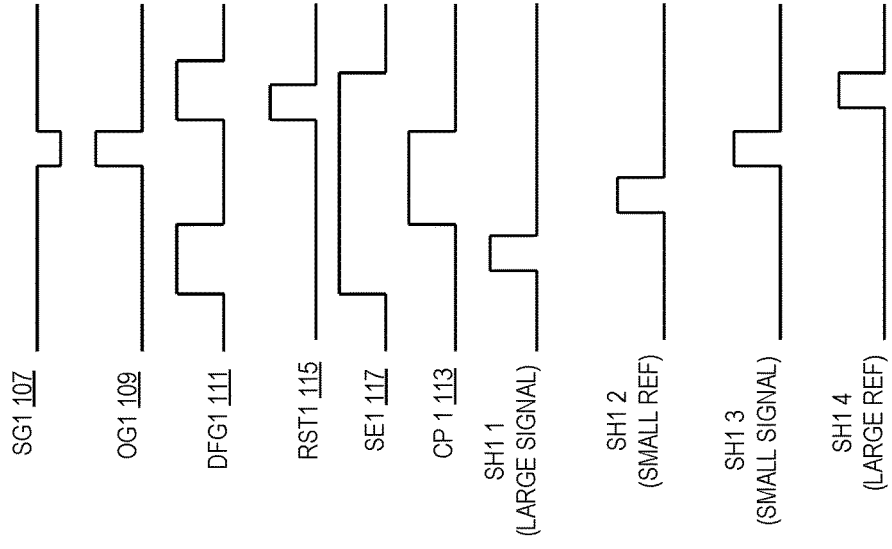
Figure 3C:
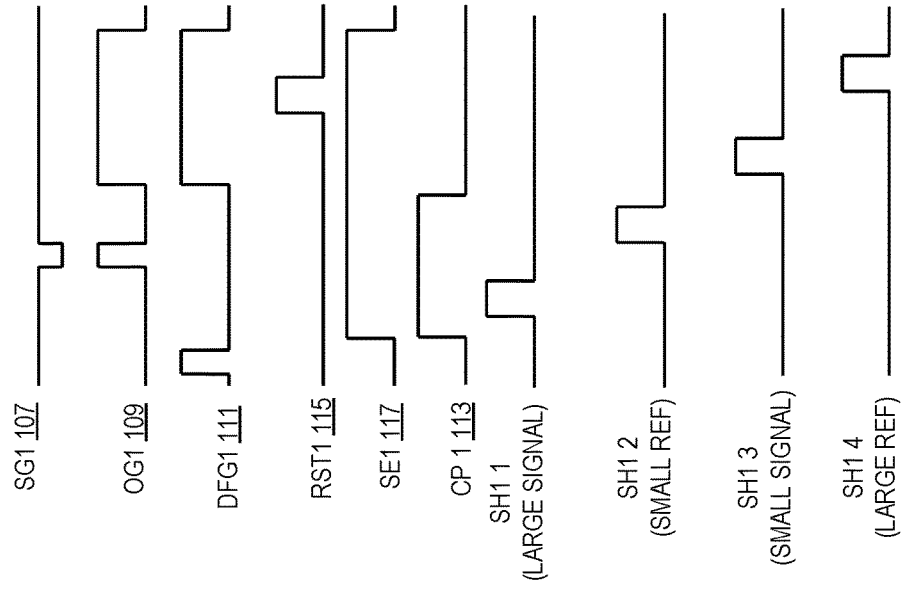
Figure 3C:
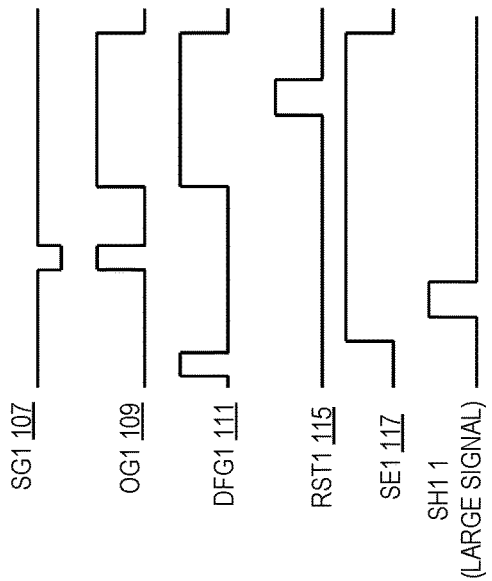

FIG. 3A-3C depict example timing diagrams which may show the timing of pixel circuitry depicted in FIGS. 1A-2, in accordance with the teachings of the present disclosure. One of ordinary skill in the art having the benefit of the present disclosure will appreciate that other timing may be used to operate the circuitry depicted.

As shown in FIG. 3A, the device architectures depicted in FIGS. 1A-1B may be used to implement a global shutter. In the illustrated example, first storage gate 107, first output gate 109, first dual floating diffusion gate 111, and reset transistor 115 are all turned on to reset the image charge in first floating diffusion 106, and first capacitor 113. Then transfer gate 105 is turned on to facilitate global readout. Excess charge is allowed to flow from floating diffusion 106 to capacitor 113. As depicted, circuitry in the second LOFIC may perform the same operations out of phase with the first LOFIC.

FIGS. 3B-3C depict examples of rolling readout timing diagrams, in accordance with the teachings of the present disclosure. FIG. 3B depicts a first timing diagram and FIG. 3C depicts a second alternate timing diagram. Both timing diagrams may be the result of the circuits in FIG. 1A or 1B being used in a pseudo rolling readout configuration. In both FIGS. 3B and 3C, correlated double sampling is employed to obtain accurate measurements of image charge. In correlated double sampling the output of the pixel circuit is measured twice: once in a known condition (with no image charge) and once in an unknown condition (with image charge). Here, correlated double sampling is used to both measuring image charge in, and a reference signal for, the floating diffusion, and the floating diffusion with the capacitor.

Referring to the left hand timing diagram of FIG. 3B (which may correspond to the circuit diagram in FIG. 1A), charge on the first floating diffusion and the capacitor is measured (e.g., sample and hold, "SH1 1" is high when first dual floating diffusion gate 111 is also logic high—which connects the floating diffusion and the capacitor). Next a reference signal (SH1 2) is read out of the floating diffusion since the first dual floating diffusion gate 111 is logic low, while select transistor 117 is logic high. Then, after first output gate 109 is turned on, image charge on just the floating diffusion is read out (SH1 3). Lastly a reference signal (SH1 4) is readout of both the floating diffusion and the capacitor. By sampling all four states of the LOFIC circuit, the charge imparted to the floating diffusion and capacitor can be accurately determined (e.g., by subtracting the reference signals from the actual measurements).

As shown in the depicted example, the timing diagram on the right (which may correspond to the circuit diagram in FIG. 1B) is similar to the timing diagram on the left, except signal ground CP1 113 is applied during readout of the charge (both the image signal and reference signal) from the floating diffusion.

FIG. 3C depicts native LOFIC timing diagrams. Accordingly, the timing diagrams illustrated in FIG. 3C are similar to the timing diagrams depicted in FIG. 3B. However, in the left-hand timing diagram (which may correspond to the circuit diagram in FIG. 1A), first a reference charge is read out (SH1 1) of the floating diffusion. Then, the output gate 109 is turned on and charge is read out of storage gate 107 to the floating diffusion. The floating diffusion is read out again (SH1 2), this time with the image charge in the floating diffusion. Next, first dual floating diffusion gate 111 is turned on, and charge is allowed to flow from the floating diffusion to the capacitor. Charge is then read out (SH1 3) of both the floating diffusion and the capacitor simultaneously. Next the reset transistor 115 is turned on, and a reference signal is read out of both the capacitor and the floating diffusion.

In the right-hand timing diagram (which may correspond to the circuit diagram in FIG. 1B), signal ground is applied during readout of the reference signal from the floating diffusion (SH12) and the readout of image charge from the floating diffusion (SH13).

In the above description, various pieces of circuitry are described. One of ordinary skill in the art having the benefit of the present disclosure will appreciate that the timing of electrical signals applied to the various pieces of circuitry can occur in any order and even in parallel. Moreover, pieces of circuitry and timing events may be added or removed, in accordance with the teachings of the present disclosure. It is appreciated that transistors may be referred to as "switches" or "gates" in accordance with the teachings of the present disclosure.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:
1. An image sensor, comprising:
 a photodiode disposed in a semiconductor material to generate image charge in response to incident light;
 a first transfer gate coupled to the photodiode to extract the image charge from the photodiode in response to a first transfer signal;
 a first storage gate coupled to the first transfer gate to store the image charge received from the first transfer gate;
 a first output gate coupled to the first storage gate to receive the image charge from the first storage gate;
 a first capacitor coupled to the first output gate to store the image charge;
 a first dual floating diffusion gate coupled between the first output gate and the first capacitor to output the image charge to the first capacitor;
 a second transfer gate coupled to the photodiode to extract the image charge from the photodiode in response to a second transfer signal;
 a second storage gate coupled to the second transfer gate to receive the image charge from the second transfer gate;
 a second output gate coupled to the second storage gate to receive the image charge from the second storage gate; and
 a second capacitor coupled to the second output gate to store the image charge; and a second dual floating diffusion gate coupled between the second output gate and the second capacitor to output the image charge to the second capacitor.

2. The image sensor of claim 1, further comprising:
a first floating diffusion coupled between the first output gate and the first dual floating diffusion gate to receive the image charge from the first output gate; and
a second floating diffusion coupled between the second output gate and the second dual floating diffusion gate to receive the image charge from the second output gate.

3. The image sensor of claim 2, further comprising:
a source follower transistor coupled to the first floating diffusion and the second floating diffusion to amplify the image charge on at least one of the first floating diffusion or the second floating diffusion.

4. The image sensor of claim 3, further comprising a row select transistor coupled to a first terminal of the source follower transistor to output an amplified signal from the source follower transistor.

5. The image sensor of claim 3, further comprising:
a first select transistor coupled between the first floating diffusion and the source follower transistor to output the image charge from the first floating diffusion to the source follower transistor in response to a first select signal; and
a second select transistor coupled between the second floating diffusion and the source follower transistor to output the image charge from the second floating diffusion to the source follower transistor in response to a second select signal.

6. The image sensor of claim 3, further comprising:
a first reset transistor coupled to the first capacitor to reset the image charge in the first capacitor in response to a first reset signal; and
a second reset transistor coupled to the second capacitor to reset the image charge in the second capacitor in response to a second reset signal.

7. The image sensor of claim 2, wherein the first storage gate includes a storage node for holding the image charge before transferring the image charge to the first floating diffusion.

8. The image sensor of claim 1, wherein the first capacitor is coupled to at least one of signal ground or chassis ground.

9. The image sensor of claim 1, wherein the image sensor includes a plurality of photodiodes including the photodiode arranged into an array, and wherein a global shutter is used to output image data from the image sensor.

10. The image sensor of claim 1, wherein the first storage gate is coupled between the first transfer gate and the first output gate.

11. The image sensor of claim 1, wherein the first transfer gate is adapted to transfer the image charge from the photodiode at a first frame rate frequency, wherein the second transfer gate is adapted to transfer the image charge from the photodiode at a second frame rate frequency, and wherein the second frame rate frequency is faster than the first frame rate frequency.

12. A method of capturing an image with an image sensor, comprising:
absorbing incident light with a photodiode disposed in a semiconductor material to generate image charge;
transferring the image charge from the photodiode to a first lateral overflow integration circuit (LOFIC) at a first frame rate frequency, wherein the first LOFIC includes:
a first transfer gate coupled to the photodiode to extract the image charge from the photodiode in response to a first transfer signal;
a first storage gate coupled to the first transfer gate to store the image charge received from the first transfer gate;
a first output gate coupled to the first storage gate to receive the image charge from the first storage gate;
a first capacitor coupled to the first output gate to store the image charge; and
a first dual floating diffusion gate coupled between the first output gate and the first capacitor to output the image charge to the first capacitor; and
transferring the image charge from the photodiode to a second LOFIC at a second frame rate frequency, wherein the second frame rate frequency is faster than the first frame rate frequency, and wherein the second LOFIC includes:
a second transfer gate coupled to the photodiode to extract the image charge from the photodiode in response to a second transfer signal;
a second storage gate coupled to the second transfer gate to receive the image charge from the second transfer gate;
a second output gate coupled to the second storage gate to receive the image charge from the second storage gate; and
a second capacitor coupled to the second output gate to store the image charge; and
a second dual floating diffusion gate coupled between the second output gate and the second capacitor to output the image charge to the second capacitor.

13. The method of claim 12, wherein the second frame rate frequency is two or more times faster than the first frame rate frequency.

14. The method of claim 12, wherein transferring the image charge from the photodiode to the first LOFIC includes turning on the first transfer gate to transfer the image charge from the photodiode to the first storage gate, and turning on the first output gate to transfer the image charge from the storage gate to a first floating diffusion.

15. The method of claim 14, wherein transferring the image charge from the photodiode to the second LOFIC includes turning on the second transfer gate to transfer the image charge from the photodiode to the second storage gate, and turning on the second output gate to transfer the image charge from the second storage gate to a second floating diffusion.

16. The method of claim 15, further comprising:
transferring the image charge from the first floating diffusion to the first capacitor using the first dual floating diffusion gate coupled between the first floating diffusion and the first capacitor; and
transferring the image charge from the second floating diffusion to the second capacitor using the second floating diffusion gate coupled between the second floating diffusion and the second capacitor.

17. The method of claim 15, further comprising:
resetting the image charge in the first capacitor and the first floating diffusion with a first reset transistor coupled to the first capacitor; and
resetting the image charge in the second capacitor and the second floating diffusion with a second reset transistor coupled to the second capacitor.

18. The method of claim 12, further comprising outputting the image charge from the first LOFIC to a source follower transistor using a first select transistor coupled between a first floating diffusion and the source follower transistor; and outputting the image charge from the second LOFIC to the source follower transistor using a second select transistor coupled between a second floating diffusion and the source follower transistor.

19. The method of claim 12, further comprising:

measuring the image charge in the first floating diffusion;

measuring the image charge in the first floating diffusion and the first capacitor;

measuring a first reference signal in the first floating diffusion; and measuring a second reference signal in the first floating diffusion and the first capacitor.

* * * * *